ically united States Patent [19]
Kashibe et al.

[11] Patent Number: 4,822,760
[45] Date of Patent: Apr. 18, 1989

[54] PROCESS OF REGENERATING PALLADIUM SALT CATALYSTS

[75] Inventors: Masaki Kashibe; Hideyuki Sugishita; Nobuyoshi Okada, all of Ube, Japan

[73] Assignee: UBE Industries, Ltd., Ube, Japan

[21] Appl. No.: 139,179

[22] Filed: Dec. 24, 1987

Related U.S. Application Data

[63] Continuation of Ser. No. 853,128, Apr. 17, 1986, abandoned, which is a continuation of Ser. No. 747,650, Jun. 21, 1985, abandoned.

[30] Foreign Application Priority Data

Jun. 25, 1984 [JP] Japan ................................. 59-130781

[51] Int. Cl.$^4$ .................... B01J 31/40; B01J 27/28; C07C 69/76; C07C 53/10
[52] U.S. Cl. .................... 502/24; 423/22; 502/27; 502/28; 502/38; 502/50; 560/96; 562/597; 562/608; 562/609
[58] Field of Search .................... 502/22, 24, 27, 38, 502/50; 423/22; 562/608

[56] References Cited

U.S. PATENT DOCUMENTS 2,902,435  9/1959  Weisz ................................. 502/24
3,461,157  8/1969  Olivier et al. ........................ 502/38
3,480,558  11/1969  Lum et al. ............................ 502/50

FOREIGN PATENT DOCUMENTS 160332  12/1982  Japan ................................. 423/22

Primary Examiner—Paul E. Konopka
Attorney, Agent, or Firm—Frishauf, Holtz, Goodman & Woodward

[57]             ABSTRACT

A process of regenerating a palladium salt catalyst comprising, in combination, steps of:
(I) heating an organic residue containing a palladium salt catalyst which has been separated from a reaction solution, at a temperature of not lower than 330° C. under an inert gas atmosphere to produce a reduced and thermally decomposed porous product;
(II) firing the porous product produced in the step I under an oxygen-containing atmosphere; and
(III) treating the product fired in the step II with an acid to produce a palladium salt.

9 Claims, No Drawings

PROCESS OF REGENERATING PALLADIUM SALT CATALYSTS

This application is a continuation of application Ser. No. 853,128, filed Apr. 17, 1986, which is a continuation application of application Ser. No. 747,650, filed June 21, 1985 both now abandoned.

BACKGROUND OF THE INVENTION

1. Field of the Invention

The present invention relates to a process of regenerating palladium salt catalysts.

2. DESCRIPTION OF PRIOR ART

Palladium salt catalysts have been widely used in catalyzing such reactions as oxidation, dehydrogenation, hydrogenation, isomerization and dimerization.

For example, the palladium salt catalysts are used in reactions of producing an aldehyde from an olefin by the Wacker process, forming a glycol ester for forming vinyl acetate from an olefin and acetic acid, and dimerizing benzene and terephthalates.

It is also known that a biphenyl tetracarboxylic acid ester can be produced through oxidative coupling in the presene of a palladium salt catalyst. Generally, the biphenyl tetracarboxylic acid ester formed in the reaction is in the form of a mixture of both isomers, namely, 3,3',4,4'-biphenyl tetracarboxylic acid tetraalkyl ester and 2,3,3',4'-biphenyl tetracarboxylic acid tetraalkyl ester. In this case, however, if a catalyst containing a palladium salt, a copper salt, and a basic bidentate ligand such as 1,10-phenanthroline or 2,2'-bipyridine is present in the reaction system, the former isomer, which is useful as a starting material for producing polyimide, can be formed selectively. Therefore, the process using the above-mentioned catalyst is quite adequate for commercial productions.

Since palladium is a very expensive metal, it is desirable to recover a palladium salt catalyst for regeneration from the reaction solution after completion of the reaction such as of oxidation, dehydrogenation, hydrogenation, isomerization or dimerization, thereby using repeatedly the palladium metal catalyst.

The recovery and regeneration of a palladium salt catalyst can be performed in the following manner. A palladium salt catalyst is separated from the reaction solution in combination with an organic substance; then, the separated residue is first burnt in order to eliminate the organic substance, and then palladium contained in the resultant ash is regenerated by an activation treatment using an acid.

The regeneration process which involves the burning step has been disclosed, for example, in Japanese Patent Provisional Publication No. 54(1979)-9597, in which a deactivated palladium catalyst, which has been produced by the reaction in a lower aliphatic monocarboxylic acid, is first heated above 450° C. in the presence of air for oxidation and then subjected to treatment in nitrogen gas.

However, if a palladium salt catalyst possessing a great amount of an organic substance (e.g. a palladium salt catalyst separated from an organic reaction solution) is heated directly in an atmosphere containing oxygen such as air, the organic substance on the surface of the palladium salt catalyst begins to burn first, which consequently gives a hard metallic surface to the palladium salt catalyst, and the organic substance being present inside of the palladium catalyst is left unburnt. Therefore, the regeneration efficiency is very low in the process. To increase the efficiency, the firing should be performed over a long period of time. Further, if the burning is incomplete and if a large amount of unburnt carbon remains in the ash, the efficiency of regenerating the palladium salt catalyst is extremely lessened Accordingly, the above-mentioned process is not satisfactory as a commercially employable regeneration process.

OBJECT OF THE INVENTION

The principal object of the present invention is to provide a process for regenerating a palladium salt catalyst, which has been used in an organic reaction and then separated together with an organic substance from said reaction solution, in an efficient manner within a short period of time.

SUMMARY OF THE INVENTION

This invention relates to a process of regenerating palladium salt catalysts comprising, in combination, the steps of:

(I) heating an organic residue containing a palladium salt catalyst which has been separated from a reaction solution containing a palldium salt catalyst, at a temperature of not lower than 330° C. under an inert gas atmosphere to produce a reduced and thermally decomposed porous product—reductive thermal decomposition step;

(II) firing the porous product produced in the step I under an oxygen-containing atmosphere—firing step; and (III) treating the product fired in the step II with an acid to produce a palladium salt—acid treating step.

Nitrogen gas is preferred as the inert gas in the present process.

The reduced and thermally decomposed product formed in the step I of the present process (reductive thermal decomposition process) is a porous material, which is typically in a bulky sponge-like form.

The porous product obtained in the first reductive decomposition step can be then fired easily within a relatively short period of time as compared with firing of the solid product obtained in the conventional firing step, and then the firing is done completely, because oxygen is sufficiently supplied into the porous product in the former case. Therefore, the ratio of regeneration of a palladium salt catalyst becomes superb, and moreover the catalyst regenerated shows a high catalytic activity.

DETAILED DESCRIPTION OF THE INVENTION

In the step I (reductive thermal decomposition) of the present invention, an organic residue containing a palladium salt catalyst, which has been separated from the reaction solution containing a palladium salt catalyst therein, is reduced by heat treatment under an inert gas atmosphere at a temperature of not lower than 330° C.

An organic residue containing a palladium salt catalyst, which is used in the above process, can be any residue as far as it has been separated from a reaction solution containing an organic substance and a palladium salt catalyst. Examples of the employable organic residue include residues separated from reaction solutions produced through oxidation, dehydrogenation, hydrogenation, isomerization or dimerization of organic compounds.

Also the method of separation of a residue is not restricted to a specific method. The residues, which are separated by any prior art such as distillation or filtration, are employable in the process of the present invention.

The palladium salt catalysts, which are regenerated by the present invention, can be simple palladium salts and a combination of palladium salts with a metal such as copper, nickel or platinum; an oxide or a salt of the above-mentioned metal; or an organic compound such as 1,10-phenanthroline or 2,2'-bipyridine.

The catalysts placed on carriers can be also treated by the present process.

In the first step of the present process, the organic residue containing a palladium salt catalyst is heated at a temperature of not lower than 330° C. under an inert gas atmosphere, and through this heat treatment the residue is reduced and thermally decomposed.

An inert gas to be used in this step is not limited to a specific gas and can be selected from those gases which do not react with palladium metal, such as nitrogen gas, helium gas, neon gas and argon gas. Nitrogen gas is preferred in consideration of the economic advantage.

The flow rate of the inert gas is not restricted to a specific rate but commonly is more than 10 Nl/hour and more preferably in the range of 50 to 1,000 NL/hour per 1 kg. of the separated organic residue.

The temperature, at which the organic residue is reduced and thermally decomposed, should be not lower than 330° C. Further, the preferable range of the temperature is 350° C. to 700° C., and the more preferable range is 450° C. to 550° C. If the organic residue is reduced and thermally decomposed at a temperature below 330° C., the organic residue shows almost no expansion, and consequently the reduced and thermally decomposed product of a desirable porous form is hardly obtained.

Generally, such reductive thermal decomposition is performed by elevating the temperature of the organic separated residue from a relatively low temperature (e.g. room temperature) to the aforementioned temperature. The rate of this temperature elevation is not restricted to a specific rate; however, the temperature is elevated from room temperature to the above temperature within five hours and preferablly within two hours. If the period of the temperature elevation exceeds excessively more than five hours, the expansion of the residue tends to be suppressed.

The time required for the reductive thermal decomposition at a temperature of not lower than 330° C. varies with the amount and kind of an organic separated residue to be treated, but it is generally not less than 30 minutes and preferably one to three hours.

The reductive thermal decomposition can be performed using a conventional device such as a crucible-type electric furnace, a top heart electric furnace, a rotary kiln or a muffle furnace.

Prior to the reductive thermal decomposition step, the organic residue can be preliminarily dried. Especially when the organic residue contains moisture, this preliminary drying treatment would help carrying out the reductive thermal decomposition of the residue effectively.

The preliminary drying is generally performed by heating the organic separated residue to a temperature not higher than 150° C.

In case the preliminary drying is performed, the time required for the drying should be included in the period of the temperature elevation to the temperature of the reductive thermal decomposition.

The reduced and thermally decomposed product produced by the reductive thermal decomposition of the organic separated residue containing a palladium salt catalyst under an inert gas (preferably nitrogen gas) has a porous body such as of a bulky sponge, and its apparent volume is at least five times (normally not less than ten times) as much as the initial volume before the treatment. The weight of the reduced thermally decomposed product decreases to not higher than 50% or normally 20% to 40% of the weight of the organic residue before the treatment.

The reduced and thermally decomposed product of a sponge-like form obtained in the step I can be successively fired under an oxygen-containing atmosphere.

The firing process of the step II is performed in order to eliminate an organic component, which is bonded or adheres to the reduced and thermally decomposed product, and also carbonated product produced in the reductive thermal decomposition step or in the present step.

The oxygen-containing atmosphere can be selected from any gas containing oxygen, and air is economically advantageous.

In this firing process, the temperature should be not lower than 500° C. or preferably in the range of 500° C. to 800° C. There is no specific limitation on the period of time required for the firing, as far as an organic substance in the reduced and thermally decomposed product can be burnt out at the above-mentioned temperature. Normally the period is more than thirty minutes or preferably one to five hours including the time required for the temperature elevation.

It is also possible to place the reduced and thermally decomposed product directly in the firing device which is previously heated to the firing temperature.

Another possible way is to use the same device used for the reductive thermal decomposition for the firing in the following manner. After the reductive thermal decomposition is performed, the supply of an inert gas to the device is stopped, and the same device is then filled with the oxygen-containing gas while keeping the temperature of the device constant. Finally, the temperature of the device is elevated to the above-mentioned temperature to carry out the firing.

In case air is used as the oxygen-containing atmosphere, the flow rate of air is not limited to a specific value, and either a natural rate or an accelerated rate can be used.

The device used for the firing of the reduced and thermally decomposed substance having a porous structure is not restricted to a specific device but it is preferred to use the same device which is previously used for the reductive thermal decomposition process, since the operation can be carried out continuously. Therefore, the device for the firing can be selected from known devices such as a crucible-type electric furnace, a top heart electric furnace, rotary kiln or muffle furnace.

The fired product obtained in the above-described manner contains a carbonaceous product in an amount not more than 1% by weight or generally not more than 0.3% by weight.

The fired product obtained in the step II is then treated with an acid in the following step III, whereby a palladium salt is formed.

Prior to advancing into the step III of the acid treatment, it is preferable to have the fired product subjected to a reduction treatment. It is possible to produce a palladium salt by subjecting the fired product simply to the acid treatment, but a palladium salt can be formed more easily if the reduction treatment is applied before the acid treatment.

The reducing agent used for the reduction treatment of the fired product can be selected from, for example, hydrogen and organic reducing agents. Hydrogen is especially adequate for this reduction treatment. The product of palladium subjected to the reduction treatment using hydrogen can be almost quantitatively converted to a salt such as a carboxylate, and moreover this reduction treatment can be carried out easily in an efficient manner.

The reducing treatment using hydrogen is performed generally at a temperature in the range from room temperature to 300° C. or preferably from 50° C. to 100° C. at a pressure in the range of an atmospheric pressure to 300 kg/cm$^2$ over the reaction period of from ten minutes to ten hours or preferably from thirty minutes to two hours.

The reducing treatment is generally carried out in a solvent, but it can also be done without a solvent. The solvent to be employed for the reducing treatment can be selected from aliphatic carboxylic acids such as formic acid, acetic acid, oxalic acid, propionic acid, butyric acid and valeric acid and their acid anhydrides; and from aromatic carboxylic acids such as benzoic acid. The most preferable solvent is acetic acid. Also, as a solvent employed for the reducing treatment, other solvents such as water can be used.

If the palladium salt as regenerated is desired in the form of a carboxylic acid salt, it is preferable to use as solvent in the reducing treatment the carboxylic acid which corresponds to the carboxyl moiety of the desired palladium salt.

After the fired product in the step II is subjected (or not subjected) to the above reducing treatment, it is treated with an acid in the step III.

In the acid treatment of the step III, either palladium nitrate or palladium carboxylate can be regenerated by heating the fired product (or its reduced product), for example, in nitric acid or in a carboxylic acid containing a small amount of nitric acid.

The carboxylic acid to be used in the acid treatment can be selected, for example, from aliphatic carboxylic acids such as formic acid, acetic acid, oxalic acid, propionic acid and valeric acid and their acid anhydrides, and from aromatic carboxylic acids such as benzoic acid. Acetic acid is most preferable.

Alternatively, a palladium salt can be regenerated by heating the fired product (or its reduced product) in aqua regia.

The amount of an acid to be used in the acid treatment is not particularly restricted to a specific amount, so far as the equivalent weight is equal to or more than the total equivalent weight of palladium (or palladium with other metals) to be treated.

The palladium salt produced in the above treatment can be yielded in the form of crystals by removing any unreacted acid.

Further, by cooling the acid (the acid solution) containing respective salts, the palladium salt can be deposited and then separated.

Furthermore, by combining an adequate acid in this acid treatment, other metal salt catalysts used with the palladium salt catalysts can be separated and collected.

The fired product, for example, containing both palladium and copper is first treated with a carboxylic acid to predominantly form a carboxylic acid salt of copper, and the unreacted substance (palladium) is filtered out. The unreacted carboxylic acid is removed from the filtrate by evaporation to yield the copper carboxylate. After the above unreacted substance is again subjected to the reducing treatment, a carboxylic acid containing a small amount of nitric acid is added to the resultant product to be heated in order to obtain a palladium carboxylate (the above palladium carboxylate generally contains a small amount of copper).

It is possible to deposit the fired product (or its heat-treated product) containing both palladium and copper in the form of a chelate by reacting it, in the presence of nitric acid, with a basic bidentate ligand such as 1,10-phenanthroline or 2,2'-bipyridine in an aqueous solvent and then subjecting it to cooling. Copper nitrate formed in the reaction remains dissolved in the solution, because it is highly soluble in an aqueous solvent. Therefore, using the above manner, the palladium salt can be efficiently separated out and collected as a chelate compound.

The palladium salt catalyst regenerated by the above described process can be again used as a catalyst with no further treatment, in reactions such as oxidation, dehydrogenation, hydrogenation, isomerization and dimerization. Further, other metal catalyst components or organic catalyst components can be added to the regenerated palladium salt catalyst for the use. Further, each of these catalysts can be deposited on a carrier for the use.

The working examples of the present invention and comparison examples are given below.

EXAMPLE 1

400 g. of an organic separated residue containing palladium acetate (containing 1,500 ppm of Pd) was placed in an electric muffle furnace. After nitrogen gas was introduced into the furnace at the rate of 200 Nl/hour, the residue was heated at a temperature varying from room temperature to 500° C. over the period of 35 minutes and then subjected to reductive thermal decomposition for 1 hour.

The organic separated residues containing palladium acetate used in other examples were identical to the one described in the above.

The reduced and thermally decomposed product was palladium oxide containing a small amount of metal palladium having a sponge-like form whose density was 0.03 to 0.04 g/cm$^2$ and whose weight was 30 to 40% of the initial weight. The volume of the sponge-like product was about 12 times as much as that of the initial organic separated residue.

Subsequently, the supply of nitrogen gas to the electric muffle furnace was stopped, and air was allowed to pass into the furnace. The above reduced and thermally decomposed product of a sponge-like body was fired at an elevated temperature up to 550° C. for a period of 5 hrs. The powdery fired product was obtained.

The fired product had a weight of 0.2% of the initial weight and contained (according to analysis) 0.1 to 0.2% by weight of unburnt carbon. The concentration of palladium in the product was 75% by weight. 2 g. of the fired product and 200 ml. of glacial acetic acid were placed in a 350 cc-stainless steel vessel equipped with a magnetic stirrer, a gas inlet and a pressure adjusting valve. While the product was stirred at the rotation speed of 500 rpm., hydrogen gas was introduced into the vessel under the pressure of 3 kg/cm$^2$, and then the product was reduced at 60° C. for 1 hour.

After the reaction was complete, the reaction solution was taken into a four-necked flask equipped with a thermometer, a stirrer and a glove cooler. To the solution was added 1 ml. of 60% conc. nitric acid and then was heated to 117° C. under reflux for 1 hour.

After the reaction was complete, the reaction solution was filtered over a G-3 glass filter. No insoluble product was observed.

The filtrate was concentrated in a rotary evaporator, and the deposited crystals were collected by filtration.

The crystals obtained were analyzed and determined to be palladium acetate of 100% purity. The catalytic activity of the palladium acetate was found to be satisfactory.

EXAMPLES 2-4

The palladium salt catalyst was regenerated in each example of Examples 2 to 4 by essentially the same process as described in Example 1 except that for Example 2 the firing period was changed to 1.5 hours, for Example 3 the temperature of the reductive thermal decomposition under nitrogen gas atmosphere was changed to 400° C. and the firing period to 2 hours, and for Example 4 the temperature of the reductive thermal decomposition under nitrogen gas atmosphere was changed to 350° C. and the firing period to 3.5 hours.

The reduced and thermally decomposed product obtained by the reductive thermal decomposition process had a sponge-like form for every case.

The reaction solution having been subjected to the acid treatment was filtered over a G-3 glass filter. No insoluble product was observed.

The filtrate was concentrated in a rotary evaporator, and the deposited crystals were collected by filtration.

The crystals obtained were analyzed and determined to be palladium acetate of 100% purity. The catalytic activity of the palladium acetate was found to be satisfactory.

In Table 1 are set forth the density of the reduced and thermally decomposed products, amount of unburnt carbon present in the fired products and regeneration rate.

TABLE 1

|  | Density (g/cm$^2$) | Amount of Carbon (%) | Regeneration Rates (%) |
|---|---|---|---|
| Example 2 | 0.035 | 0.12 | 100 |
| 3 | 0.054 | 0.25 | 100 |
| 4 | 0.100 | 0.85 | 87 |

The regeneration rate here was calculated according to the following equation.

Regeneration rate (%)=(amount of Pd in catalyst regenerated)/(amount of Pd in organic separated residue)×100

EXAMPLES 5-7

The palladium salt catalyst was regenerated in each example of Examples 5 to 7 by essentially the same process as described in Example 1 except that for Example 5 the flow rate of nitrogen gas was changed to 28 Nl/hour, for Example 6 the flow rate of nitrogen gas was changed to 42 Nl/hour, and for Example 7 the flow rate of nitrogen gas was changed to 460 Nl/hour.

The reduced and thermally decomposed product obtained by the reductive thermal decomposition process had a sponge-like form for every case.

The reaction solution having been subjected to the acid treatment was filtered over a G-3 glass filter. No insoluble product was observed.

The filtrate was concentrated in a rotary evaporator, and the deposited crystals were collected by filtration.

The crystals obtained were analyzed and determined to be palladium acetate of 100% purity. The catalytic activity of the palladium acetate was found to be satisfactory.

EXAMPLE 8

The palladium salt catalyst was regenerated by essentially the same process as described in Example 1 except that the flow rate of nitrogen gas was changed to 230 Nl/hour, the firing temperature under the natural air stream was 780° C., and the period of the firing was 3 hours.

The reduced and thermally decomposed product obtained by the reductive thermal decomposition process had a sponge-like form.

The reaction solution which had been subjected to the acid treatment was filtered over a G-3 glass filter. No insoluble product was observed.

The filtrate was concentrated in a rotary evaporator, and the deposited crystals were collected by filtration.

The crystals obtained were analyzed and determined to be palladium acetate of 100% purity. The catalytic activity of the palladium acetate was found to be satisfactory.

EXAMPLE 9

The palladium salt catalyst was regenerated by essentially the same process as described in Example 1 except for the following. Palladium having been finished in the reducing treatment in Example 1 was placed in a solution of glacial acetic acid and filtered. The filtrate was placed in a four-necked flask equipped with a thermometer, a stirrer and a glove cooler. To the solution there was then added 200 ml of 60% conc. nitric acid.

The reduced and thermally decomposed product obtained by the reductive thermal decomposition process had a sponge-like form.

The reaction solution which had been subjected to the acid treatment was filtered over a G-3 glass filter. No insoluble product was observed.

The filtered solution was concentrated in a rotary evaporator, and crystals were formed. The crystals obtained were analyzed and determined to be palladium nitrate of 100% purity. The catalytic activity of the product was found to be satisfactory.

EXAMPLE 10

The palladium salt catalyst was regenerated by essentially the same process as described in Example 9 except that aqua regia was used instead of nitric acid, and the reaction temperature of the acid treatment in the reaction solution was changed to 20° C.

The reduced and thermally decomposed product obtained by the reductive thermal decomposition process had a sponge-like form.

The reaction solution having been subjected to the acid treatment was filtered over a G-3 glass filter. No insoluble product was observed The filtrate was concentrated and dried to form crystalline solid.

The crystals obtained were analyzed and determined to be palladium chloride of 100% purity. The catalytic activity of the product was found to be satisfactory.

EXAMPLES 11–14

The palladium salt catalyst was regenerated by essentially the same process as described in Example 1 except that the period of temperature elevation in the reductive thermal decomposition process was changed to 20 minutes for Example 11, 51 minutes for Example 12, 84 minutes for Example 13 and 214 minutes for Example 14.

The reduced and thermally decomposed product obtained by the reductive thermal decomposition process had a sponge-like form for every case.

The reaction solution having been subjected to the acid treatment was filtered over a G-3 glass filter. No insoluble product was observed.

The filtrate was concentrated in a rotary evaporator, and the deposited crystals were collected by filtration.

The crystals obtained were analyzed and determined to be palladium acetate of 100% purity. The catalytic activity of the palladium acetate was found to be satisfactory.

EXAMPLE 15

3 Kg. of the organic separated residue containing palladium acetate was placed in a crucible-type electric furnace of diameter of 900 mm and depth of 970 mm.

The residue was reduced and thermally decomposed by heating for 1 hour to the temperature of 500° C., while nitrogen gas was supplied into the furnace at the flow rate of 230 Nl/hour. Then, nitrogen gas was replaced by air, and air was supplied at the same flow rate as in the above to fire the residue at 550° C. over 5 hours.

The reduced and thermally decomposed product obtained by the reductive thermal decomposition process had a sponge-like form.

The fired product weighed 6.5 g. which was 0.15% of the initial weight before the treatment. The analysis of the fired product showed that 0.15% by weight of unburnt carbon was present in the product.

2 g. of the fired product was separately taken to be subjected to the reducing treatment and the acid treatment in the same manner as in Example 1 so as to regenerate the palladium salt catalyst.

The reaction solution which had been subjected to the acid treatment was filtered over a G-3 glass filter. No insoluble product was observed.

The filtrate was concentrated in a rotary evaporator, and the deposited crystals were collected by filtration.

The crystals obtained were analyzed and determined to be palladium acetate of 100% purity. The catalytic activity of the palladium acetate was found to be satisfactory.

EXAMPLE 16

100 Kg. of the organic separated residue containing palladium acetate was placed in a top heart electric furnace of 2.2×2.2×1.6 (m). The residue was reduced and thermally decomposed by heating at the temperature of 500° C. for a period of 5 hours, while nitrogen gas was supplied into the furnace at a flow rate of 15 Nm³/hour. Then, nitrogen gas was replaced with air, and air was supplied at the same flow rate as in the above to fire the residue at 550° C. over the period of 5 hours.

The reduced and thermally decomposed product obtained by the reductive thermal decomposition process had a sponge-like form.

The fired product amounted to 223 g., and the analysis of this fired product showed that 0.18% by weight of unburnt carbon was present in the product.

2 g. of the fired product was separately taken to be subjected to the reducing treatment and the acid treatment in the same manner as in Example 1 so as to regenerate the palladium salt catalyst.

The reaction solution having been subjected to the acid treatment was filtered over a G-3 glass filter. No insoluble product was observed.

The crystals obtained were analyzed and determined to be palladium acetate of the purity 100%. The catalytic activity of the product was also satisfactory.

COMPARISON EXAMPLE 1

The same process as described in Example 1 was performed except that the reductive thermal decomposition under nitrogen atmosphere was omitted, and the firing was performed under the natural flow of air at 700° C. over the period of 5 hours.

There was obtained 12.3 g. of a fired product in the form of hard grains.

The fired product was subjected to the acid treatment and the reducing treatment in the same manner as in Example 1. Then the product was filtered. Almost all palladium remained as a filter cake on a glass filter, and no palladium salt catalyst was regenerated.

COMPARISON EXAMPLE 2

Essentially the same process as described in Comparison Example 1 was performed except that the firing temperature was changed to 1,000° C.

The fired product was of hard grains.

The fired product was subjected to the acid treatment and the reducing treatment in the same manner as in Example 1. Then the product was filtered. Almost all palladium remained as a filter cake on a glass filter, and no palladium salt catalyst was regenerated.

COMPARISON EXAMPLE 3

The same process as described in Example 1 was performed to carry out the reductive thermal decomposition except that the temperature of the reductive thermal decomposition was changed to 300° C.

The residue was not at all expanded by the reductive thermal decomposition, and the product did not have a porous structure.

The obtained product was then subjected to the firing treatment, the reducing treatment and the acid treatment and the acid treatment in the same manner as in Example 1. The product after having treated with the acid was filtered. Almost all palladium remained as a filter cake on a glass filter, and no palladium salt catalyst was regenerated.

We claim:

1. A process of regenerating a palladium salt catalyst from an organic residue which has been separated from a reaction solution containing a biphenyl tetracarboxylic acid ester obtained through oxidative coupling in the presence of a palladium salt catalyst and a basic bidentate ligand comprising, in combination, the steps of heating the organic residue at a temperature of not lower than 330° C. under an inert gas atmosphere flowing at a rate of more than 10Nl, per hour, per Kg. of organic residue. To produce a reduced and thermally decomposed bulky porous product having an apparent volume of at least five times as much as the initial volume of the said organic residue;

firing said porous product under oxygen-containing atmosphere to obtain a fired product containing a carbonaceous product of not higher than 1% by weight based on the fired product;

reducing said fired product to obtain a reduced product; and treating said reduced product with an acid to produce a palladium salt.

2. The process as claimed in claim 1, wherein said inert gas is nitrogen gas.

3. The process as claimed in claim 1, wherein said heating in the first step is performed at a temperature in the range of 350° C. to 700° C.

4. The process as claimed in claim 3, wherein said heating is performed at a temperature in the range of 450° C. to 550° C.

5. The process as claimed in claim 1, wherein said firing in the second step is performed at a temperature of not lower than 500° C.

6. The process as claimed in claim 5, wherein said firing is performed at a temperature in the range of 500° C. to 800° C.

7. The process as claimed in claim 1, wherein said palladium salt catalyst contains palladium acetate and/or palladium nitrate.

8. The process as claimed in claim 1, wherein the fired product in the second step contains a carbonoceous product in an amount not higher than 0.3% by weight based on the fired product.

9. The process as claimed in claim 1, wherein said bulky porous product has an apparent volume of not less than ten times as much as the initial volume of the said organic residue.

* * * * *